United States Patent [19]

Baker et al.

[11] Patent Number: 4,827,772
[45] Date of Patent: May 9, 1989

[54] DIFFERENTIAL PRESSURE SENSING MEANS AND METHOD

[75] Inventors: Brian K. Baker; Rei-Nan R. Hwan; Lori A. Leu, all of Houston, Tex.

[73] Assignee: Texaco Inc., White Plains, N.Y.

[21] Appl. No.: 109,565

[22] Filed: Oct. 19, 1987

[51] Int. Cl.⁴ .................... G01L 7/08; G01L 13/02
[52] U.S. Cl. ................................... 73/716; 73/756
[58] Field of Search ............... 73/756, 747, 749, 750, 73/736, 38, 4 R, 716, 718, 719, 720, 721, 722, 714, 717

[56] References Cited

U.S. PATENT DOCUMENTS

| | | | |
|---|---|---|---|
| 2,562,494 | 7/1951 | Hejduk | 73/747 |
| 3,118,305 | 1/1964 | Weeks | 73/747 |
| 3,524,341 | 8/1970 | Roy | 73/38 |
| 4,512,179 | 4/1985 | Umble et al. | 73/4 R |
| 4,537,079 | 8/1985 | Lee | 73/747 |

Primary Examiner—Donald O. Woodiel
Attorney, Agent, or Firm—Robert A. Kulason; James J. O'Loughlin; Ronald G. Gillespie

[57] ABSTRACT

A differential pressure sensing means and method includes an inlet receiving a fluid having a first pressure. Another inlet receives a fluid having a second pressure. A plurality of pressure sensing devices are connected to the first and second inlets. Each pressure sensing device senses a pressure differential within a different predetermined range of pressures and provides a pressure signal representative thereof. An output circuit connected to the plurality of pressure signals provides a pressure signal selected from one of the signals provided by the plurality of pressure sensing devices so as to provide a pressure signal representative of the pressure difference between the first and second pressures of the fluids.

3 Claims, 1 Drawing Sheet

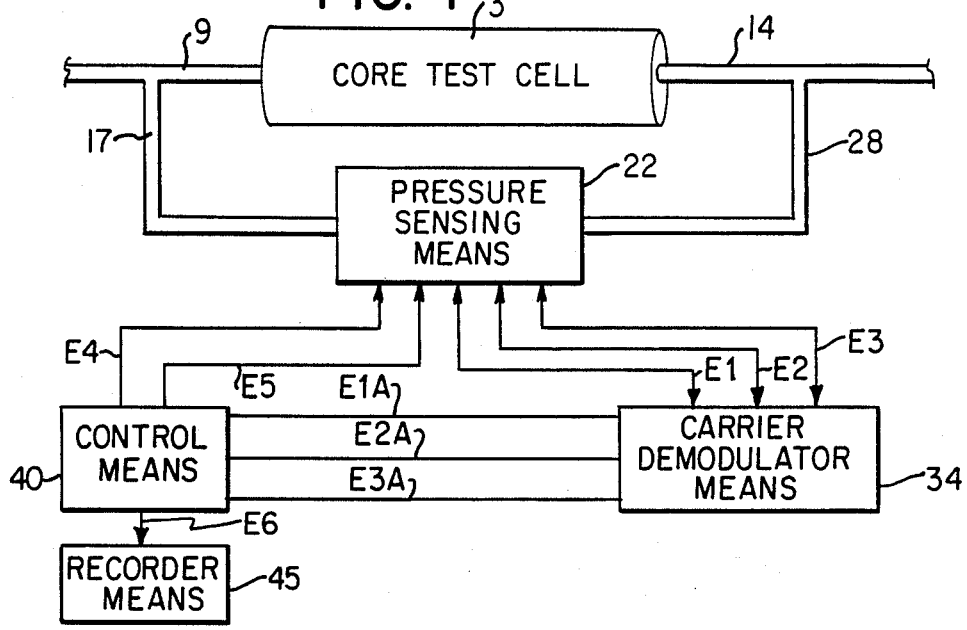
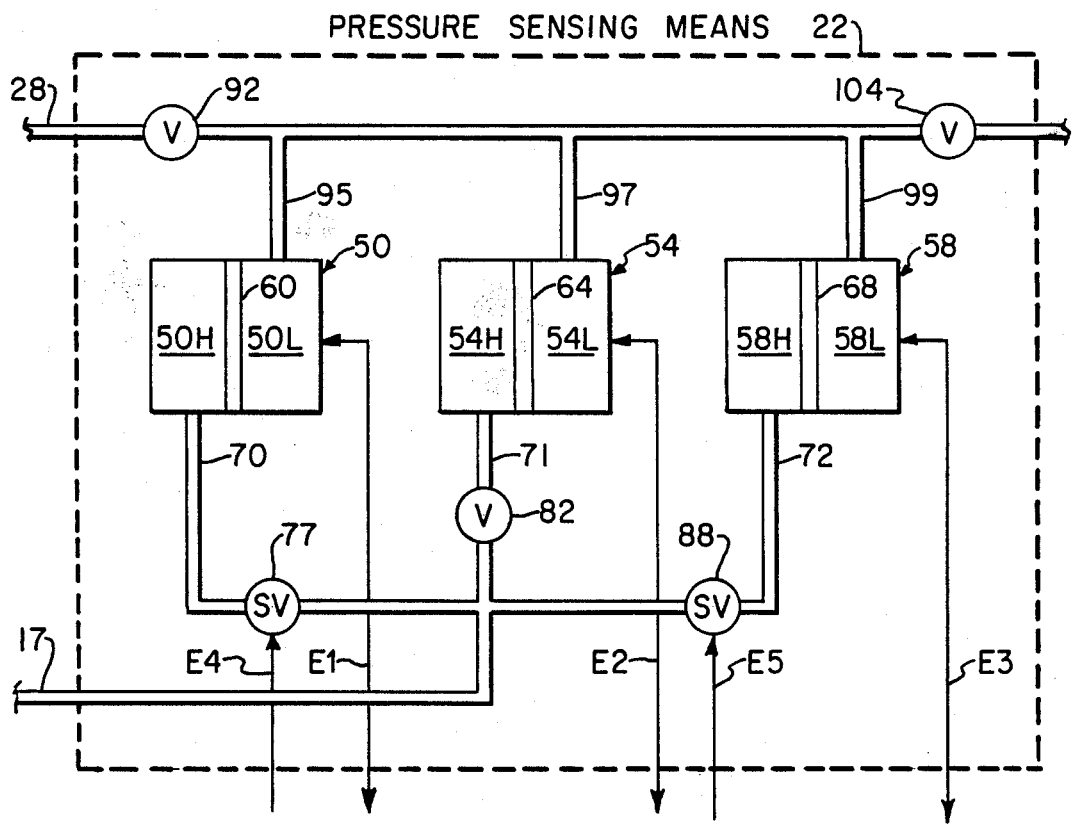

DIFFERENTIAL PRESSURE SENSING MEANS AND METHOD

BACKGROUND OF THE INVENTION

Field of the Invention

The present invention relates to pressure sensing means and methods in general and more particularly for differential pressure sensing means and methods.

SUMMARY OF THE INVENTION

A differential pressure sensing means and method includes an inlet receiving a fluid having a first pressure. Another inlet receives a fluid having a second pressure. A plurality of pressure sensing devices are connected to the first and second inlets. Each pressure sensing device senses a pressure differential within a different predetermined range of pressures and provides a pressure signal representative thereof. An output circuit connected to the plurality of pressure signals provices a pressure signal selected from one of the signals provided by the plurality of pressure sensing devices so as to provide a pressure signal representative of the pressure difference between the first and second pressures of the fluids.

The objects and advantages of the invention will appear more fully hereinafter from a consideration of the detailed description which follows, taken together with the accompanying drawings wherein one embodiment of the invention is illustrated by way of example. It is to be expressly understood, however, that the drawings are for illustration purposes only and they are not to be construed as defining the limits of the invention.

DESCRIPTION OF THE DRAWINGS

FIG. 1 is a simplified block diagram showing a differential pressure sensing system constructed in accordance with the present invention for measuring the pressure drop of a fluid flowing through a test cell.

FIG. 2 is a simplified block diagram of the pressure sensing means shown in FIG. 1.

DESCRIPTION OF THE INVENTION

With reference to FIGS. 1 and 2 there is shown a multi-range pressure sensing system connected across a core test cell 3. As used in core flood testing, the liquid is pumped through a line 9 into core test cell 3 which holds a core sample. The liquid exists core test call 3 through another line 14. The pressure sensing system of the present invention determines the pressure drop across test cell 3 by receiving an input through line 17 to pressure sensing means 22. The exiting pressure is also sampled by way of line 28 connected to pressure sensing means 22.

Carrier demodulator means 34 provides carrier signals E1 through E3 to pressure sensing means 22 and receives those signals back again relating to the sensed presure. It should be noted and will be discussed hereinafter, that only one of the signals E1, E2 or E3, is providing intelligence to carrier demodulator means 34. Carrier demodulator means 34 provides signals E1a, E2a and E3a corresponding to the intelligence carried on carrier signals E1, E2, and E3, respectively to control means 40. Control means 40 provides control voltages E4 and E5 to pressure sensing means 22 and a signal E6 corresponding to the sensed pressure drop to recorder means 45.

With reference to FIG. 2, signals E1, E2 and E3 are provided to pressure sensors 50, 54 and 58, having metal membranes 60, 64 and 68, respectively. Membranes 60, 64 and 68 separate each presure sensor into a high pressure chamber and a low pressure chamber denoted by the suffix H for high and L for low, along with the pressure sensors numeric identification. The use of the terminology "high and low pressure" in regards to pressure sensors 50, 54 and 58, is strictly the pressure relationship of one chamber to the other chamber and is not used to designate high pressure versus low pressure in the usual sense. Pressure sensors 50, 54 and 58 are purchased items which may be purchased from Validyne Inc. with their Model #DP15.

Line 17 divides into three separate lines, 70, 71 and 72, which are connected to chambers 50H, 54H and 58H, respectively. A solenoid valve 77 is located in line 70. Valve 77 receives control voltage E4. A bleed valve 82 is located in line 71 while another solenoid valve 88 is located in line 72.

Line 28 has a valve 92 and then separates into lines 95, 97 and 99. Connected to chambers 50L, 54L and 58L, respectively are pressure sensors 50, 54 and 58, respectively. Further, there is a bleed valve 104 located after the junction of lines 28, 95, 97, and 99.

In operation, as the fluid is pumped to test cell 3 through line 9 and it exits through line 14, a pressure drop is developed across test cell 3 so that the pressure in line 17 is greater than the pressure in line 28. As that pressure drop increases from the start of the testing, control means 40 provides signal E4 so that it causes solenoid valve 77 to be open. Carrier demodulator means 34 is providing carrier signal E1 to pressure sensor 50. Pressure sensor 50 will provide signal E1 as a signal indicating the pressure so long as the pressure drop across element 60 is 10 psi or less. As signal E1 indicates that the pressure drop is increased at least 10 psi level, correspondingly signal E1A is indicating that the pressure drop across cell 3 is increased until it is reaching 10 psi. Control means 40 at 10 psi will switch over causing signal E4 to close solenoid valve 77 and signal E5 to open solenoid valve 88 which heretofore has been closed so that the pressure drop across cell 3 is now read across element 68 of pressure sensor 58. Similarly, signal E3, the carrier signal, is providing information back to carrier demodulator means relating to the sensed pressure across element 58. Pressure sensor 58 will read and provide E3 as a meaingful signal while the pressure drop across test cell 3 is within the range of 10 psi to 100 psi. Similarly, signal E3A, which is representative of that pressure, is provided to control means 40. As the pressure drop across test cell 3 increases to 100 psi, control means 40 receiving signals E3A will again make a switch over in pressure sensor when signal E3 is indicative of reaching 100 psi. At that point control signal E5 causes solenoid valve 88 to close so that the pressure drop across cell 3 is only across element 64 of pressure sensor 54. Pressure sensor 54 provides its intelligence signal on carrier signal E2 so that carrier demodulator means 34 provides signal E2A corresponding to the sensed pressure across element 64 of pressure sensor 64.

Control means 40 which may be of a simple logic type for decoding the three signals E1, E2A and E3A to control the solenoid valves also has within it internal switching mechanisms for providing a signal E6 which is actually signal E1A, E2A, or E3A, depending on which pressure range the pressure drop lies in. For example, from 0 to 10 psi, signal E6 corresponds to signal E1A. From 10 psi to 100 psi, signal E6 corresponds to signal E3A.

Although the present invention has been shown as measuring the pressure drop across a test cell and hence the pressure differential of the same fluid, the present invention may also be used to measure the pressure differential between two different fluids.

What is claimed is:

1. A differential pressure sensing system comprising:
   first inlet means for receiving a fluid having a first pressure;
   second inlet means for receiving a fluid having a second pressure;
   a plurality of differential pressure sensing means connected to the first and second inlet means, each sensing means being means for sensing a pressure differential within a different predetermined range of pressures and providing a pressure signal representative thereof, and including
   a housing having a membrane separating the housing into two chambers with one chamber containing fluid from the first inlet means at the first pressure and the other chamber containing fluid from the second receiving means at the second pressure so that a pressure drop occurs across the membrane; and
   output means connected to the plurality of pressure sensing means for selecting a pressure signal from one of the pressure sensing means in accordance with the pressure difference between the fluids pressures and providing the selected signal as an output signal, and
   wherein the output means provides a signal to each pressure difference sensing means and a change in the pressure drop across the membrane causes a change in the signal so that in effect the output means sees the changed signal as the pressure signal from the pressure sensing means.

2. A system as described in claim 1 in which there the plurality of pressure sensing means includes:
   a first differential pressure sensing means having a first predetermined pressure sensing range,
   a second differential pressure sensing means having a second predetermined pressure sensing range which is greater than the first predetermined pressure sensing range, and
   a third differential pressure sensing means having a third predetermined pressure sensing range which is greater than the second predetermined pressure sensing range; and
   the output means selects the pressure difference signal in accordance with a predetermined pressure range.

3. A system as described in claim 2 further comprising:
   first valve means being responsive to a control signal for blocking the fluid from reaching the one chamber of the first differential pressure sensing means when the pressure difference across the membrane reaches a first predetermined value equal to or less than the maximum value of first predetermined pressure sensing range and for passing the fluid to the one chamber of the first differential pressure sensing means when the pressure difference is less than the first predetermined value, and
   second valve means responsive to a second control signal for preventing the first fluid from entering the one chamber of the second differential pressure sensing means when the pressure difference across the membrane reaches a second predetermined value that is equal to or less than the maximum value of the second predetermined pressure sensing range and for passing the fluid to the one chamber of the second differential pressure sensing means when pressure is less than the second predetermined value; and
   wherein the signal means provides the first and second control signals to the first and second valve means, respectively, in accordance with the signals provided by the first and second differential pressure sensing means.

* * * * *